United States Patent
Kies et al.

[11] Patent Number: 6,050,766
[45] Date of Patent: Apr. 18, 2000

[54] TWO PART SLIP-ON NUT

[75] Inventors: Antonius M. Kies, Oisterwijk; Geradus Emanual Cornelus Van Gijsel, Goirle, both of Netherlands

[73] Assignee: Erico International Corporation, Solon, Ohio

[21] Appl. No.: 09/202,944

[22] PCT Filed: Jul. 1, 1997

[86] PCT No.: PCT/US97/11566

§ 371 Date: Dec. 22, 1998

§ 102(e) Date: Dec. 22, 1998

[87] PCT Pub. No.: WO98/00645

PCT Pub. Date: Jan. 8, 1998

Related U.S. Application Data

[60] Provisional application No. 60/021,082, Jul. 2, 1996.

[51] Int. Cl.[7] .............................. F16B 37/08; F16B 37/16
[52] U.S. Cl. .......................... 411/437; 411/433; 411/522
[58] Field of Search ................................... 411/104, 432, 411/433, 437, 522

[56] References Cited

U.S. PATENT DOCUMENTS

| | | |
|---|---|---|
| 2,364,880 | 12/1944 | Tinnerman . |
| 3,844,518 | 10/1974 | Long . |
| 4,274,323 | 6/1981 | Resnicow . |
| 4,473,205 | 9/1984 | Rumble . |
| 4,634,327 | 1/1987 | Kowalski . |
| 4,802,804 | 2/1989 | Hirohata . |
| 4,826,376 | 5/1989 | Aldridge et al. . |
| 5,039,266 | 8/1991 | Nagayoshi et al. . |
| 5,098,241 | 3/1992 | Aldridge et al. . |
| 5,605,424 | 2/1997 | Boville et al. ...................... 411/437 X |

FOREIGN PATENT DOCUMENTS 0666444  1/1995  European Pat. Off. .

*Primary Examiner*—Neill Wilson
*Attorney, Agent, or Firm*—Renner, Otto, Boisselle & Sklar, P.L.L.

[57] ABSTRACT

A nut includes a sheet metal U-shape housing which can be positioned on a threaded rod laterally so that the legs of the housing straddle the rod. A U-shape spring clip is provided having parallel legs with inwardly projecting thread forms on the legs adapted to mesh with the threads of the rod. The spring clip legs are insertable in two slots in one leg of the housing also to straddle the rod at right angles to the legs of the housing. The housing includes supports for the spring clip thread forms which hold them in engagement with the rod thread. Snap latches preclude ordinary removal of the clip as long as the rod is present.

17 Claims, 2 Drawing Sheets

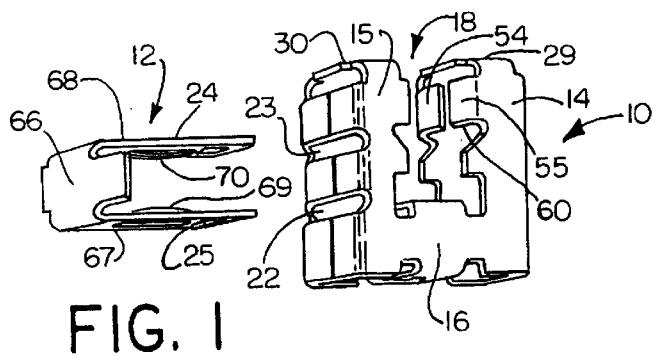
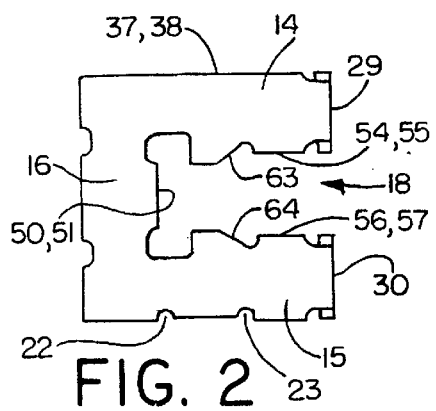
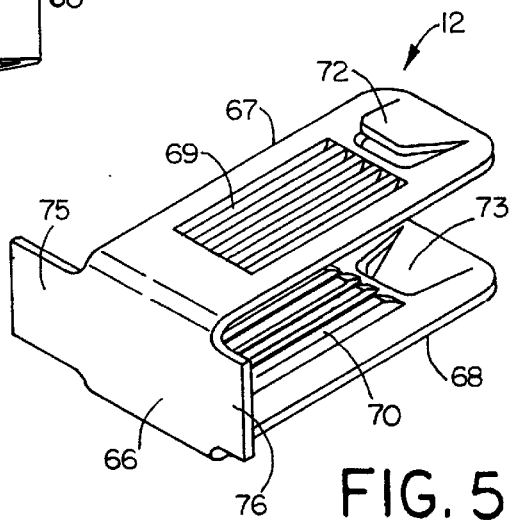
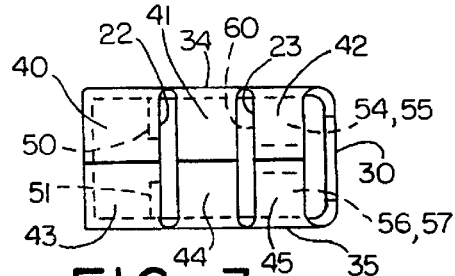
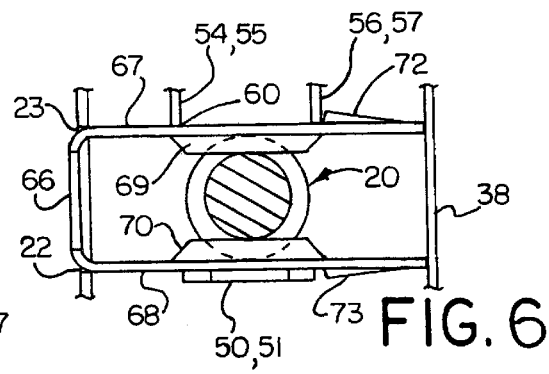
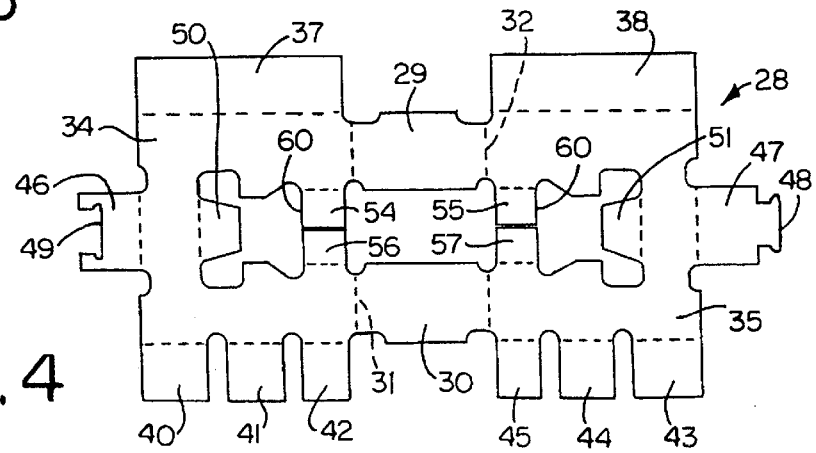

TWO PART SLIP-ON NUT

This appln is a 371 of PCT/US97/11566 filed Jul. 1, 1997. And also claims the benefit of U.S. Provisional No. 60/021,082 filed Jul. 2, 1996.

This invention relates generally as indicated to a two part nut and more particularly to a nut which can be assembled on a threaded rod at any location therealong, and then tightened.

BACKGROUND OF THE INVENTION

Threaded rod is provided in substantial lengths and is widely used to construct or hang utilities or other items. It is also used as tie-rods and has many purposes. The rod can be of substantial length such as several meters or more. To thread a conventional nut on a rod of such length requires many turns and is a dull and time consuming job. In many hanger or fastening situations, the ends of the rod may be blocked with something already installed or fixed, and to put another nut on the rod could require substantial disassembly. It would, of course, be desirable to be able to position the nut on the rod laterally at the desired position and then simply tighten it with a few turns.

Many and varied solutions to these problems have been proposed. A typical solution is that found in U.S. Pat. No. 4,826,376 to Slip-on Lock Nut Company of Lake Orion, Mich. U.S.A. The two C-shaped nut members are joined together for limited axial movement and relative rotation. The two parts are complex and the nut, while effective, is costly. Others are overly complex or simply don't function as a conventional nut which can be tightened after being slipped on. Others occupy too much vertical or axial space along the rod. Others simple don't have the holding power to clamp a load or may slip under load, particularly an offset load.

Examples of the wide variety of devices which have attempted to solve the problem are seen in the following: U.S. Pat. Nos. 3,844,518, 4,473,205, 4,634,327 and 5,098,241 and European Published Application 066644A1.

SUMMARY OF THE INVENTION

The invention is a two-part nut which may be installed on a threaded rod laterally and then turned to tighten against another object. One part of the nut is a sheet metal housing which, normal to the axis of the rod, is U-shape and has a non-circular exterior profile. Preferably other than the opening between the legs, the profile is in the form of a square nut. The housing is positioned on the rod so that the legs straddle the rod, and the housing has a relatively short dimension axially of the nut. The housing may be formed from a single piece of sheet metal with a progressive die.

The second part is a U-shape spring metal clip which includes a flat bight portion and parallel spring legs. The legs of the clip fit in two parallel slots in the exterior of one of the legs of the housing. The clip has two positions. One is retracted where the legs of the spring clip do not cross or interfere with the opening between the legs of the housing. The other is a fully seated position where the legs of the clip span the opening between the legs of the housing. In such fully seated position, the bight portion of the clip is flush against the exterior of the one leg of the housing between the parallel slots while the tips of the legs of the spring clip almost abut the unslotted exterior of the other leg of the housing. The spring legs of the clip are provided with inwardly struck linear thread impressions which match the threads of the rod. The respective thread impressions are a half-pitch offset.

The interior of the housing is mostly open except for certain folded flanges. Two flanges, one from each side of the housing at the center of the bight portion of the housing, back up and support the center of one leg of the clip. Flanges on the insides of the legs of the housing overlie and back up the other leg of the clip. The other leg thus has two such back-up supports, one symmetrically on each side of the threaded rod. The tips of both legs of the clip are provided with outwardly struck barbs which snap past such flanges when the clip is seated, locking the clip in place when the rod is present.

With the clip in a retracted but assembled position with respect to the housing, the housing is positioned laterally on a threaded rod with the legs of the housing straddling the rod. The interior of the legs of the housing are provided with guide edges properly positioning the rod in the crotch of the housing. The size of the nut and rod are, of course, related. With the rod properly positioned in the nut housing, the spring clip is then pushed in to a seated position. The tips of the two legs slide perpendicular to the legs of the housing and between the backup flanges and the exterior of the rod. The barbs snap over such flange edges and the flanges act on the thread sections as linear cams forcing such sections against the threads of the rod, but more importantly, preventing such sections from moving outwardly or away from each other under load. When the clip is seated, the nut may then be tightened with a wrench.

The barbs prevent the clip from being simply withdrawn from the seated position when the rod is present. The legs have to be pressed together for the barbs to clear the support flanges. The barbs also engage the parallel slots to hold the clip assembled to the housing in the retracted or unseated condition. With the invention, a low cost in situ nut is provided.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 an exploded perspective view of the two parts of the nut of the present invention;

FIG. 2 is a plan view of the sheet metal housing;

FIG. 3 is an elevation of the housing as seen from the bottom of FIG. 2;

FIG. 4 is a plan view of the blank from which the sheet metal housing is formed;

FIG. 5 is an enlarged perspective of the spring clip;

FIG. 6 is fragmentary enlarged section through the threaded rod showing the housing in place and the clip seated and supported by the housing;

DETAILED DESCRIPTION OF THE PREFERRED EMBODIMENTS

Figure 7:
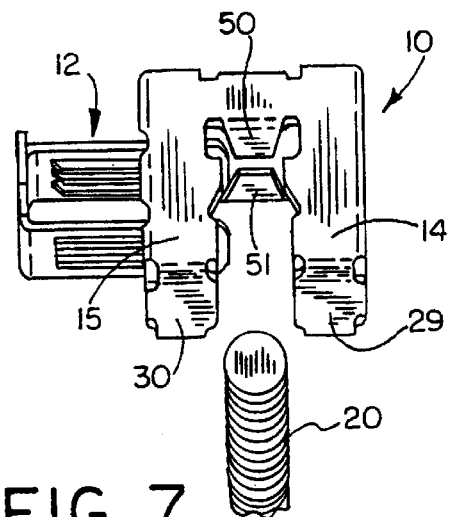
FIG. 7 is a perspective view showing the parts assembled but the clip unseated and being laterally positioned on a threaded rod.

Referring initially to FIG. 1, there is illustrated the two components of the nut in accordance with the present invention. The two components are the sheet metal housing shown generally at 10 and the spring clip shown generally at 12. The housing is formed of a single sheet of sheet metal and includes two legs shown generally at 14 and 15 with an interconnecting bight portion 16. The two legs form a crotch or opening shown generally at 18 and the legs are designed to straddle a threaded rod 20, seen for example in FIGS. 6–9.

The leg 15 of the housing is provided with parallel slots seen at 22 and 23 which are adapted to receive the legs 24 and 25 respectively, of the U-shape spring clip 12. In this manner, after the housing is positioned laterally on a nut, the clip 12 may be seated in the housing with the legs 24 and 25 entering the slots and moving to a seated position at right angles to the legs of the housing also straddling the threaded rod and when locked in place, the nut is secured to the threaded rod.

Referring now to FIGS. 2, 3, and 4, it will be seen that the housing may be formed of a single sheet or blank of sheet metal which is shown at 28 in FIG. 4. The blank includes two narrow, generally parallel portions, seen at 29 and 30 which form the ends of the legs as seen in FIG. 2. It is noted that the interior corners of the blank are provided with significant radii to facilitate the bending of the blank through the various operations of a progressive die to form the nut housing indicated. The blank is bent along the dotted lines seen at 31 and 32. This forms the parallel top and bottom surfaces 34 and 35 of the nut as seen in FIG. 3. The edges 37 and 38 seen at the top of FIG. 4 are bent toward each other to form the exterior of the leg 14 while the exterior of the opposite leg 15 is formed by bending the three tabs 40, 41, and 42 seen on one side of the blank and also the respective tabs 43, 44, and 45 on the other side of the blank to form the slotted exterior wall of the leg 15. The back of the bight portion of the nut housing is formed simply by folding the projecting end tabs seen at 46 and 47 toward each other. The tab 47 may have a projection 48 which snaps into slot 49 of the tab 46 locking the housing in its formed position. The interior of the bight portion is formed by folding the two flanges 50 and 51 toward each other. These tabs form the back of the slot or crotch 18 and the surface of such tabs facing the slot is substantially aligned with the left hand edge of slot 22 as seen in FIG. 3.

On one side of the crotch, the tabs 54 and 55 are bent toward the tabs 56 and 57 on the other side of the crotch. The edges of such tabs seen at 60 are aligned with the right hand edge of the slot 23, as seen in FIG. 3. When the tabs 54 and 55 as well as the tabs 56 and 57 are folded toward each other, this leaves ramped guide surfaces seen at 63 and 64 on each side of the interior of the slot of the housing. Such slightly projecting guide surfaces function to seat and center the housing with respect to a threaded rod when the housing is inserted laterally on the threaded rod with the legs straddling the threaded rod.

Referring now more particularly to FIGS. 1, 5, and 6, it will be seen that the spring clip 12 is also U-shape and includes a bight portion 66 and two parallel spring legs 67 and 68. Each spring leg is provided with an inwardly deformed thread section seen at 69 and 70, respectively. The thread forms are linear but the thread form 69 is offset from the thread form 70, one-half of the pitch of the threaded rod. Beyond the thread forms the two fingers are provided with outwardly struck spring tabs or latches 72 and 73, respectively. As seen more clearly in FIG. 6, the latches are designed to snap behind the inwardly extending flanges on the housing locking the clip in its seated position seen in FIG. 6 so that it cannot be removed unless the tips of the legs are forced together. With the threaded rod 20 in place, this would be exceedingly difficult. It is also noted that the bight portion of the clip optionally may be provided with a relatively long projection 75 on one side and a relatively short projection 76 on the opposite side. This provides a larger surface area at the back of the clip to enable it to be pushed by finger pressure into the housing to its seated position. It also facilitates the removal of the clip if unlatched.

Figure 8:
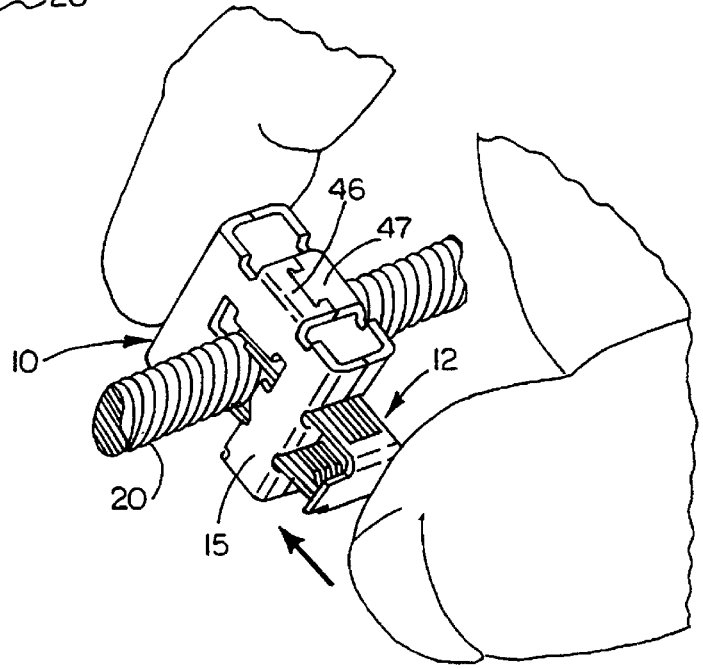
FIG. 8 is a similar perspective view showing the clip being seated.

Referring now to FIGS. 6–9, it will be seen that the nut parts in FIG. 7 are in their assembled position, but the clip has not been pushed to its seated position. In such position as seen in FIG. 7, the latches 72 and 73 will engage the inside edges of the slots in the housing holding the clip assembled to the housing even though not seated. The housing is then placed on the threaded rod so that the legs 14 and 15 straddle the rod. The guide ramps 63 and 64 assist in locating the threaded rod and housing properly. When the threaded rod is properly seated in the crotch of the notch 18, the spring clip 12 is then simply pushed in as seen in FIG. 8 to the seated position seen in FIG. 6. As the clip moves to the seated position, the long inclined ramps of the struck barbs 72 and 73 cam the clip legs inside the edges 60 and of course inside the folded tabs 50 and 51 to ensure proper engagement of the thread sections 69 and 70 with the threaded rod 20. As the clip legs move to the seated position, the ramps of the latching barbs ensure that the tips move past the various tabs while being inserted and the snap edges lock the clip in place when fully seated. When fully seated, the respective thread sections are directly backed up and held by certain edges or tabs of the housing. As seen in FIG. 6, the tabs 50 and 51 are directly behind the leg 68 backing up the center of the leg at the thread section holding the thread section 70 in mesh with the threads of the rod. The opposite leg 67 is backed up and supported by the edges 60 of the tab sets 54 and 55 on one side of the rod, and 56 and 57 on the other side. Such edge sets are symmetrically located with respect to the axis of the rod. Accordingly, a three point support or backup is provided for the two spring legs of the clip. The thread section 69 is backed up and held as a short beam against the threads of the rod 20. Both legs are snap-locked in place by the tabs 72 and 73.

Figure 9:
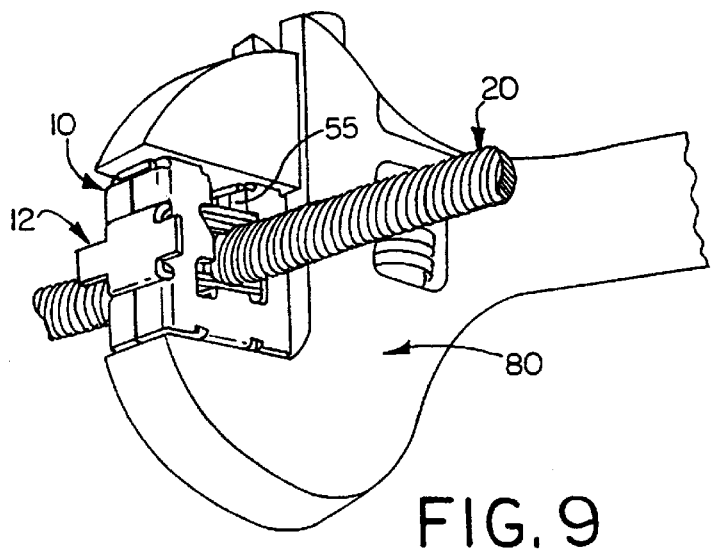
FIG. 9 is a perspective view showing the nut being tightened by a wrench.

After the clip is seated in the housing, the thread sections are in engagement with the threads of the rod and the nut may be tightened simply by turning with the crescent wrench illustrated at 80 in FIG. 9 grasping the square external configuration of the nut and tightening it against whatever object with partial or few turns. Even though the profile of the nut housing as seen in FIG. 2 is U-shape, the overall profile, save for the notch or opening between the legs 18, is in the form of a square and noncircular. This enables the nut to be turned readily by either adjustable or fixed wrenches, pliers, or by hand for that matter.

It will be appreciated that different size nuts and nut assemblies may be used with different size rods. Although the square configuration of the housing is preferred for simplicity, other forms of noncircular in-profile housing may be employed. The overall height of the nut axially of the rod is minimal so that the nut can be installed on a rod in a very narrow exposed axially length of the rod.

It can now be seen that there is provided a nut which comprises a U-shape sheet metal housing, having a bight portion and a pair of legs adapted to straddle a threaded rod. Spaced slots in one leg accommodate the legs of a spring clip also having a bight portion. The legs of the clip are adapted to be inserted in the spaced slots to clasp the threaded rods with thread impressions on each leg of the spring clip embracing the threads of the rod. The housing includes portions engaging and backing up the legs of the spring clip to maintain the thread impressions in mesh with the threads of the rod when the legs of the spring clip are seated in the slots.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

We claim:

1. A nut comprising a U-shape sheet metal housing having a bight portion and a pair of legs adapted to straddle a threaded rod, a U-shape spring clip having a bight portion and a pair of legs adapted to be inserted in the housing to clasp the threaded rod, thread impressions on each leg of said spring clip adapted to embrace the threads of the rod, and means on said housing engaging the legs of the spring clip to maintain the thread impressions in mesh with the threads when the legs of the spring clip are seated in the housing.

2. A nut as set forth in claim 1 including latch means to lock said spring clip to said housing to prevent disassembly in the seated position of the clip.

3. A nut as set forth in claim 2 wherein said latch means comprises struck tabs on the legs of the spring clip.

4. A nut as set forth in claim 3 wherein said tabs include ramps camming the tips of the legs past said means on said housing.

5. A nut as set forth in claim 3 wherein said tabs include ramps driving said legs of the clip toward each other and the thread impressions against the threads of the rod.

6. A nut as set forth in claim 5 wherein said means on said housing comprises rigid back-ups for the legs of said spring clip holding the thread impressions in engagement with the threads of the rod.

7. A nut as set forth in claim 6 including a rigid back-up centered behind one thread impression.

8. A nut as set forth in claim 7 including two rigid back-ups behind and at the ends of the other thread impression.

9. A nut as set forth in claim 8 wherein said back-ups are formed by tabs formed on said sheet metal housing.

10. A nut comprising a U-shape housing having a bight portion and parallel legs adapted to be positioned on a threaded rod laterally so that the legs straddle the rod, a pair of slots in one leg of the housing, and a U-shape spring clip having parallel legs adapted to be inserted in said slots, inwardly projecting thread forms on each leg of said spring clip adapted to straddle the rod when inserted and seated in the slots, and means in said housing backing up said thread forms with respect to the threaded rod when said spring clip is seated in said housing.

11. A nut as set forth in claim 10 wherein said means is centered behind one thread form and at each end of the opposite thread form.

12. A nut as set forth in claim 11 wherein said means are generally symmetrically arranged with respect to the axis of the threaded rod.

13. A nut as set forth in claim 12 wherein said means includes a locking edge holding the spring clip against withdrawal.

14. A nut comprising a U-shape housing having a pair of legs adapted to straddle a threaded rod, a U-shape spring clip having a pair of legs received in said housing laterally of said housing legs also to straddle said threaded rod, thread impressions on said clip legs adapted to engage said threaded rod, and abutment means on said housing engaging said legs to hold said thread impressions in engagement with the threaded rod.

15. A nut as set forth in claim 14 including lock means to lock said clip in said housing when said clip is inserted in the housing and the clip legs straddle the threaded rod.

16. A nut as set forth in claim 15 wherein said lock means comprise spring tabs on said clip legs snapping behind said abutment means.

17. A nut as set forth in claim 16 wherein said U-shape housing, but for the notch between the legs, is rectangular in profile.

* * * * *